March 10, 1964          J. W. LUCAS          3,124,035

MULTI-PURPOSE PROJECTION DEVICE

Filed Jan. 8, 1959          3 Sheets-Sheet 1

INVENTOR

James W. Lucas

March 10, 1964  J. W. LUCAS  3,124,035
MULTI-PURPOSE PROJECTION DEVICE
Filed Jan. 8, 1959  3 Sheets-Sheet 2

INVENTOR
James W. Lucas

March 10, 1964   J. W. LUCAS   3,124,035
MULTI-PURPOSE PROJECTION DEVICE
Filed Jan. 8, 1959   3 Sheets-Sheet 3

INVENTOR
James W. Lucas

United States Patent Office 3,124,035
Patented Mar. 10, 1964

3,124,035
MULTI-PURPOSE PROJECTION DEVICE
James W. Lucas, Santa Monica, Calif.
(1122 S. Robertson Blvd., Suite 5, Los Angeles 36, Calif.)
Filed Jan. 8, 1959, Ser. No. 785,693
10 Claims. (Cl. 88—24)

The present invention relates to devices generally known as overhead projectors, some of which provide means for combining secondary pictorial material with the main images being projected, and relates more particularly to an improved device of this general character having its own light source and associated image-forming means adapted to receive and project generally conventional film strips and slides; the device being further adapted to add secondary pictorial material to images formed interiorly thereof and, additionally, incorporating means for receiving projected images from an external projector and combining secondary pictorial material therewith.

The projection device of the present invention is intended for use mainly as an overhead projector, but since it has limited utility as a direct projector, it is believed advisable prefatorily to clearly distinguish between the two terms and the functions to which they will apply as used in the following specification. So-called direct projection relates to the type in which the centerline of the projected beam is straight, as is the case with motion picture projectors in theatres and in conventional amateur machines for projecting motion picture films and single film slides.

In overhead projection, however, the image-bearing light beam from the projector is directed by a plurality of mirrors or reflecting surfaces through a folded light path to a final reflecting surface above the projection device from which it is directed over the head of the person operating the device and thence onto the screen. The operator of an overhead projector is normally seated facing the audience and with his back to the screen, and this type of machine is most widely used for classroom and visual educational purposes.

In order to more clearly characterize the device of the present invention, it may be pointed out that it actually combines the single or principal functions of a conventional direct projector and those of three different types of overhead projectors generally known within the art, as follows: those having their own illumination and directing light upon the undersurface of a horizontally disposed work surface on which transparent pictorial material may be superposed and images may be formed by hand on suitable transparent material such as cellophane; secondly, overhead projection devices of the type above described and having additional or other means for positioning images in the projected light path; and, thirdly, devices adapted to receive projected images from any conventional still or motion picture projector, and having means for adding secondary pictorial material to the images being projected and directing the combined images upon a viewing screen.

This scope of versatility constitutes a functional combination in a single projection device which, insofar as this inventor has been able to ascertain, is neither presently available from equipment manufacturers nor disclosed in any references to the prior art. Furthermore, the device is structurally arranged so that its outwardly extending portions can be stowed within a compact self-formed readily portable case.

It is not meant to be implied, however, that the objects of the invention and the claims made for it are restricted to the aggregation of elements within the device and its portability. Instead, the elements of invention are believed to reside in the manner in which the light beams and picture images from a projector outside of the case are received within the device and are combined with additional pictorial material while being directed through the device onto a viewing screen along the same light path as that of an integrated projector movably disposed interiorly of the case.

As suggested in the foregoing, my invention will be seen to have a plurality of important objectives.

One important object of my invention is the provision of a multiple purpose projection device having an internal light source including a lamp and cooling system therefor, a condensing lens and reflecting surfaces, for directing a beam of light through a folded path and onto a screen, and being also adapted with means for disposing pictorial material transversely of the light path and for forming impromptu indicia such as lines and handwriting and projecting them onto a screen.

A further important object of my invention is the provision of a device of the character described in which the internal light source is further adapted with lens and slide carrier means for projecting predetermined images upon the screen, thus enabling an operator to add prepared or impromptu images to the predetermined images being projected.

Another object of my invention is the provision of a device of the character previously described which is provided with aperture means in an outer wall adapted to receive therethrough images projected from any still or motion picture projector adjacently disposed externally of the device, whereby images from the external projector are directed through the folded optical path and secondary pictorial material may be added thereto and the combined images projected onto a screen.

A further object of my invention is the provision of a projection device of the character described and having adjustment means whereby its internal projector may be utilized for direct projection upon a viewing screen independently of the folded light path.

A still further object of my invention is the provision of a multiple purpose projection device of the character described which is adapted with simple adjustment means whereby it may be changed quickly from any one of its functional arrangements to any other without interrupting the continuity of a series of pictures.

An additional object of my present invention is the provision of a combination projection device of the character described being adapted with means for folding the optical path of the internal projector to provide an image approximately equal in size to that formed within the device by the generally conventional lens of an external projector.

Another object of my invention is the provision of a combination projection device of the character described being adapted with means for supporting winding spools for a band of transparent material such as cellophane, whereby a pair of spools with a portion of the band wound on each of them may be removed and replaced without rewinding the band on one spool and disconnecting it from the other.

And an additional object of my invention is the provision of a multiple projection device of the character described being adapted with means whereby it is readily changeable from one use or combination to another without interrupting a program composed of various types of still pictures and motion pictures projected singly or having preformed still or moving images or concurrently hand-drawn designs and indicia superposed thereon.

In brief, my invention includes a generally rectangular case into which all of the outwardly extending portions of the machine are stowable when not in use; a functionally conventional projector for pictorial transparencies is adjustably disposed interiorly of the case; a first reflecting surface adjacent the front of the case directs images from the projector backwardly onto a second reflecting surface angularly disposed beneath an aperture in the top of the case in which a condensing Fresnel lens is supported between transparent panels. The first reflecting surface is affixed to a panel which is hinged to swing inwardly of an aperture in the front of the case whereby images from any conventional still or motion picture projector may be directed through the aperture and onto the angularly disposed second reflecting surface.

Recesses in the undersurface of the upper side of the case receive a pair of winding spools with which a band of transparent material having prearranged images thereon may be moved across the horizontal aperture in the top of the case, or hand-drawn characters and indicia may be formed on the transparent material synchronously and in combination with the images projected therethrough by either of the projectors. A second projection lens and a third reflecting surface, disposed at right angles to the second reflecting surface, are adjustably supported above the top of the case and are effective to receive and project any combination of images formed along the horizontal plane of the fresnel and direct the combined images along a generally horizontal path onto an upright viewing screen. Adjustable positioning means are also provided for the internal projector whereby it may be used for direct projection through a straight light path onto a viewing screen if desired.

Certain variations in form and arrangement as well as additional objects of my invention will become apparent upon examining the following specification of one preferred embodiment together with the references contained therein to the accompanying drawings, of which:

Figure 5:
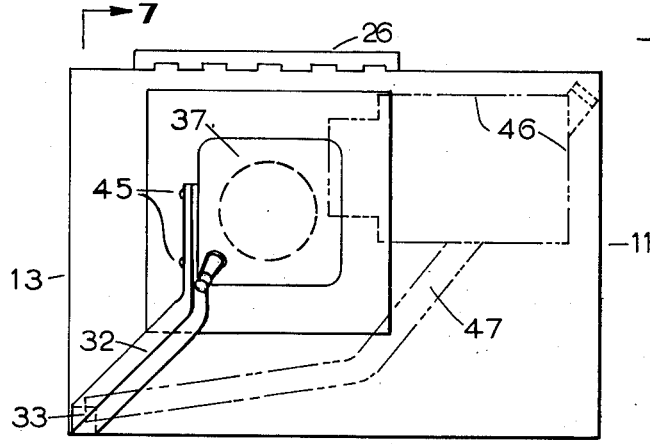
FIGURE 5 is a top view of the projection device showing in phantom the positions of the outwardly disposed lens assembly and supporting arm when stowed interiorly of the case.
Figure 6:
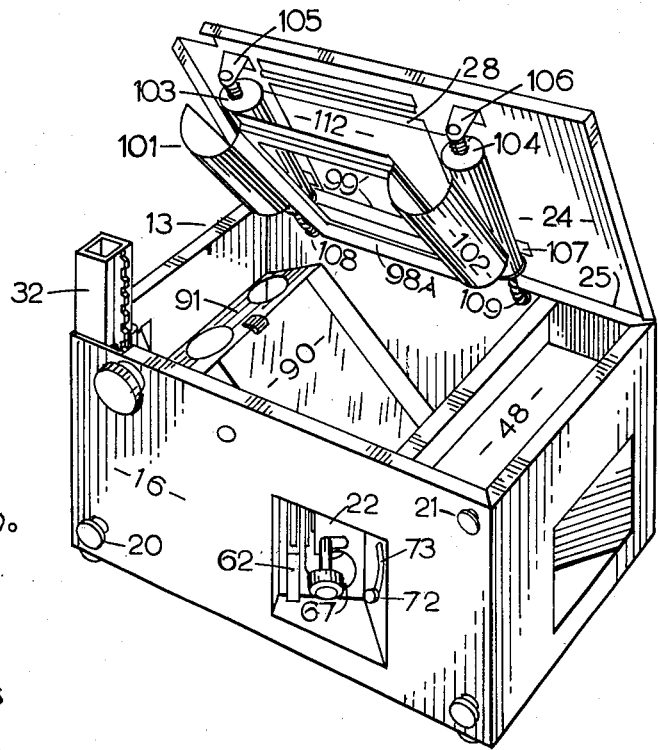
Figure 7:
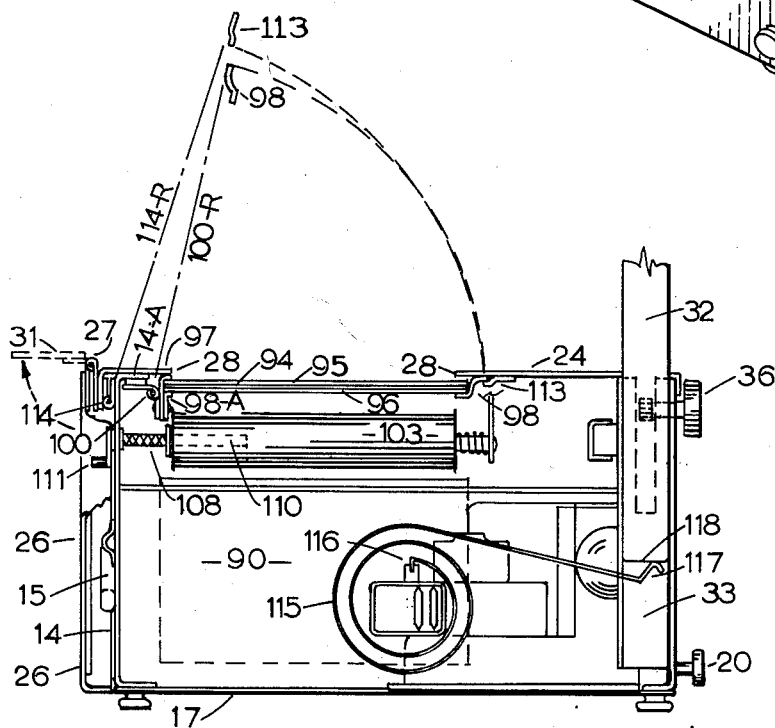

FIGURE 6 is a perspective view of the device with the hinged lid open and the fresnel mounting assembly partially open to show the means of access to the pair of winding spools and the band of transparent material thereon, and FIGURE 7 is a view from the rear of the device taken sectionally along the line and in the direction indicated by the arrows 7—7 in FIGURE 5, showing the relative positioning of the winding spools, the internal projector, second reflecting surface and other elements within the case.

Figure 2:
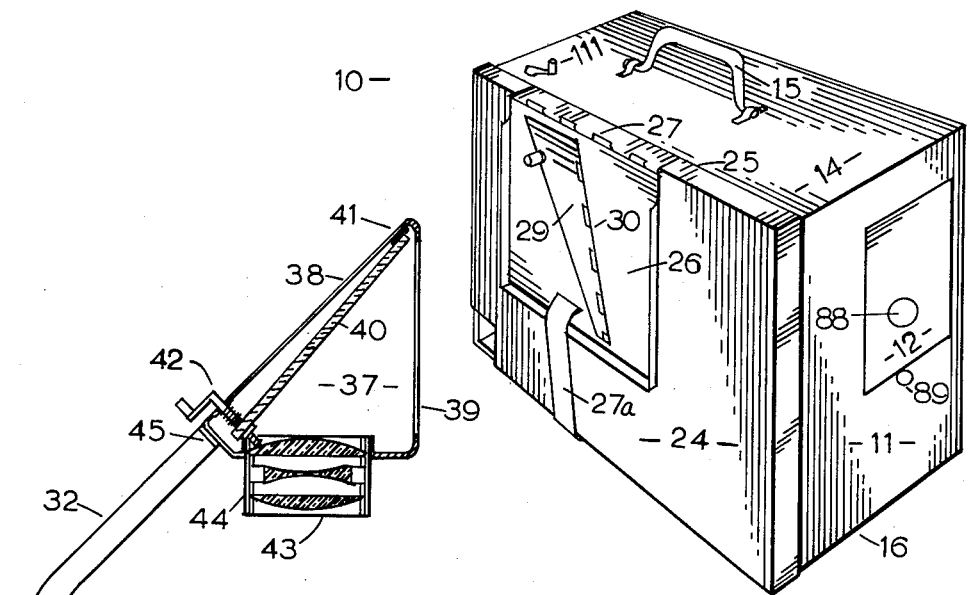
FIGURE 2 is a perspective view of the projection device constructed according to my invention and showing the manner in which the apertures in the case may be completely closed providing a self-formed readily portable carrying case.
Figure 3:
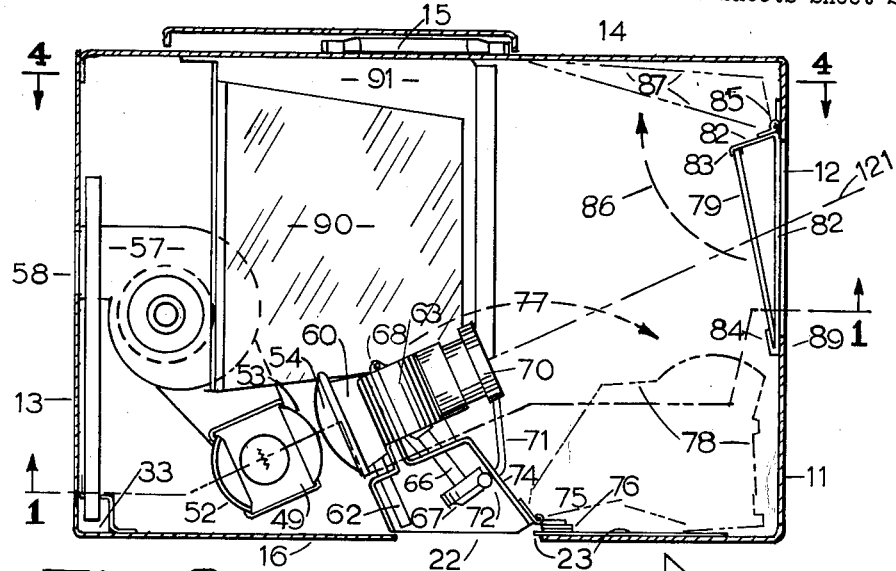
FIGURE 3 is a plan view of the projection device taken from along the line and in the direction indicated by the arrows 3—3 in FIGURE 1.

Reference is again made to FIGURE 1 which shows a projection device, constructed according to the present invention, as it would be seen in an elevational view taken sectionally along the irregular line and in the direction indicated by the arrows 1—1 in FIGURE 3. A proper understanding of the construction and arrangement of the outer case, which is designated generally by the numeral 10 will be had by a comparison of the view of FIGURE 1 which shows the device completely assembled and ready for use, with FIGURE 2 which shows the case completely closed.

The case 10 is generally rectangular in conformation and includes a frontal surface 11 having an aperture 12 therein, and a parallel back wall 13 spaced therefrom. One narrow side 14 to which, as seen in FIGURE 2, the carrying handle 15 is attached, is normally the top of the closure and the opposite narrow side 16 is normally downwardly disposed when the case is being carried. Of the two sides of greatest area, one side 17 is fitted with foot members such as 18 and 19 in FIGURE 1, and serves generally as the base when the machine is in the operating position and provides a rigid unbroken structural member relative to which the various elements of the device are positioned and attached interiorly of the case.

As seen in FIGURE 6, the narrow side 16 is also fitted with supporting feet such as 20 and 21, and the access aperture 22 which is shown open in FIGURE 6, is closed while the case is being transported or stored by means of a sliding door 23 which is clearly shown in the plan view of FIGURE 3.

The second side of greatest area 24 is actually an overlapping cover which is hinged along the line 25 to the narrow side 14 as seen in FIGURE 2 and as shown in the raised position in FIGURE 6. A partial cover 26 is hinged along the line 27 to the main cover 24, as is best shown in FIGURES 2 and 7, and serves to close a generally square aperture 28 in the main cover 24, and when the case is closed the partial cover 26 is held in the position seen in FIGURE 2 by means of a flexible strap 27a, attaching to side 16, which also serves to secure the main cover 24.

Figure 1:
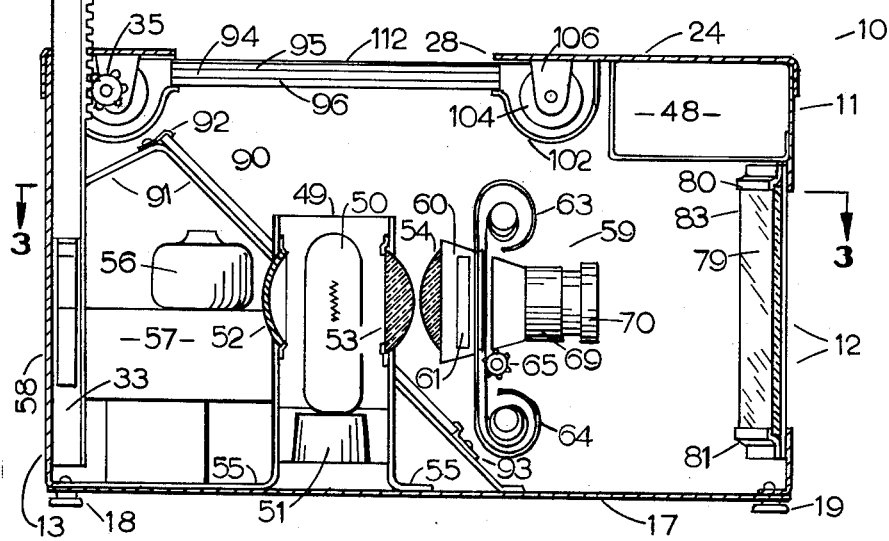
FIGURE 1 is of a sectional elevational view taken through the projector of my invention along the line and in the direction indicated by the arrows 1—1 in the plan view of FIGURE 3, and showing the projection lens assembly supported on a vertically movable arm member disposed upwardly from the top of the case.

When the device is erected in operating position, as shown in FIGURE 1, the partial door 26 is swung rearwardly over the handle 15 to the position in which it is seen in FIGURE 7, or it may be secured by means of the support bracket 29 which is seen in FIGURE 2 to be hinged along the line 30 to the door 26 in the horizontal position indicated at 31 in FIGURE 7, in which it serves as a shelf or arm rest while the device is in operating position.

A removably attachable upwardly extending arcuate arm 32, best seen in the elevational view of FIGURE 1, fragmentally in FIGURE 6 and in plan view in FIGURE 5, is engageable within a vertical channel 33 and is positionable vertically therein by means of the integral rack section 34 which is engaged by the gear 35 rotatable by means of the knob 36 disposed exteriorly of the case as is clearly shown in FIGURES 1, 6 and 7. The arm 32 serves the dual function of supporting above the projection device the lens hood assembly 37 and of moving it upwardly or downwardly as required to bring the projected images into focus on the screen.

The lens hood assembly 37 includes a triangular casing 38 having therein a frontal light passing aperture 39, a reflecting surface 40 being hinged interiorly of the casing 38 as indicated at 41 and having crank adjustment means seen at 42 for changing its angle relative to the viewing screen, and a projection lens 43 secured in a generally conventional mount 44 extending downwardly from and opening into the casing 38. The lens hood assembly 37 is removably attachable to the arm 32 by belt means indicated at 45 in FIGURES 1 and 5. As can be seen in the diagrammatic plan view of FIGURE 5, space is provided for storing the hood assembly 37 in the area 46 and the arm 32 in the area 47. A storage tray 48, best seen in FIGURES 1 and 6, is provided for connector cords, films and other accessories, thus making the device completely self contained and self enclosed when in the closed position of FIGURE 2.

Disposed interiorly of the case 10, as is most clearly seen in FIGURES 1 and 3, is a generally conventional combination film-strip and film slide projector including a light source closure 49, projection lamp 50 and socket 51, reflector 52 and condensers 53 and 54. The sides of the closure 49 are continued downwardly as seen in FIGURE 1 at 55, and fixedly attached to the base 17. Cooling of the closure 49 is effected by means of a generally conventional air exhaust system including a motor 56 driving a turbine 57 which is adapted to draw air inwardly from the top of the closure 49 and exhaust it outwardly through an aperture 58 in the rear wall 15 of the case.

The film-handling portion 59 of the projector is shown in FIGURES 1 and 3 to include a central housing 60 which serves to support the condenser 54 and is provided with an aperture 61 opening laterally thereof and adapted to receive therein a slide carrier assembly 62, and having upper and lower film-strip magazines 63 and 64, respectively, extended therefrom. The film-engaging sprocket 65 communicates by means of the shaft 66 with an external thumb knob 67 clearly shown in FIGURE 3, and this assembly 60 is hinged as indicated at 68 in FIGURE 3 to provide access to the area of the aperture plate when threading the film. The frontal portion 59 of the projector is terminated forwardly in a tubular lens amount section 69 adapted to receive adjustably therein a lens assembly 70, from which an arm 71 is extended laterally and terminated in a knob 72 which is movable, generally vertically, in an arcuate slot 73 seen in FIGURE 6.

As indicated in FIGURE 1 and clearly shown in the plan view of FIGURE 3, the forward section of the projector is supported by means of a spacing panel 74 which is hinged at 75 to a structural section 76 which, in turn, is affixed to the sidewall 16 of the case above and below the sliding door 23. In this manner the frontal section of the projector is adapted to rotate forwardly from the position in which it is seen in FIGURE 3 in the direction of the broken arrow 77 to the area indicated by the outline 78, thereby providing an aperture through which access may be had to the interior of the case without raising the cover 24 of the case and serving other functional requirements which will be subsequently explained.

It will be observed that of the two condensers 53 and 54, one 53 is affixed to the light source structure 49, and the other 54 is integral with the projection structure 59. The condenser 53 is adapted optically so that when the projection device 59 is rotated relative to the vertical hinge 75 into the area indicated at 78, a sufficiently divergent light beam is provided to completely cover the picture surface 112 to illuminate transparencies positioned or formed thereon. The other condenser 54, attached to the projector assembly, is slightly larger in diameter and adapted optically to intercept the divergent light beam of the first condenser and direct it convergently upon the opening in the aperture plate of the projection unit 59, thus projecting images disposed therein through the lens 70 to form aerial images thereof generally coincident with the horizontal plane 112, as will be more fully explained hereinafter.

As previously explained in connection with the case 10, an aperture 12 is provided in the front wall 11 and a reflecting surface 79 is movably disposed interiorly thereof in the angular and generally vertical position indicated in the FIGURES 1 and 3, and is retained in channel sections 80 and 81 which form a portion of a triangular structural member 82 which terminates laterally in vertically disposed in-bent lip portions 83 and 84 which serve to engage the vertical edges of the reflecting surface 79. The triangular member 82 is secured by means of the hinge 85 to the inner surface of the front wall 11, as clearly shown in FIGURE 3, and is thus adapted to rotate in the direction of the arrow 86 to the area indicated by the broken line 87. A finger hole 88 is provided in the frontal panel of the assembly 82, as shown in FIGURES 2 and 3 by means of which the assembly may be rotated relative to the hinge line 85 and held in the closed position seen in FIGURE 2 by the latch 89.

A second reflecting surface 90 is diagonally disposed interiorly of the case and supported by a structural panel 91 to which it is secured by the transverse strip 93 and clip 92 as seen in FIGURES 1 and 3, the panel 91 in turn being secured to the downward side 17 and the back wall 13.

A condensing Fresnel lens 94 is provided interiorly of the case between the reflecting surface 90 and the undersurface of side 24, and is dimensioned and positioned so as to completely close the aperture 28 and is held in uniplanar alinement thereunder by means of the juxtaposed upper and lower cover glasses 95 and 96, respectively, which in turn are supported between oppositely offset sides 97 and 98 of a frame assembly 99, best seen in FIGURE 6, which is hingedly attached to the undersurface of the cover 24 as shown at 100 in FIGURE 7. The frame 99 is terminated at opposite sides in semi-cylindrical concave sections 101 and 102 which serve to enclose and protect a pair of winding spools 103 and 104 which are removably attached to the undersurface of the cover 24 by means of angle brackets 105–107, as can be seen in FIGURE 6. Sections of flexible cable 108 and 109 are engaged within the rollers 103 and 104 as indicated at 110 in FIGURE 7, and extend outwardly axially therefrom through the sidewall 14 and are terminated in crank members such as 111 shown in FIGURES 2 and 7, whereby upon respective rotation of the crank members a band of transparent material 112 such as cellophane may be wound from either of the spools 103 and 104 to the other.

The frame assembly indicated generally by the numeral 99 in FIGURE 6 which serves to support the fresnel and its upper and lower cover glasses 95 and 96 respectively, including also the concave sections 101 and 102, is hinged to an inbent angular extension 14–A of the vertical sidewall 14, whereby it is adapted to rotate inwardly of the cover 24 as shown in FIGURE 6 relative to the hinge axis 100 as indicated in FIGURE 7, and the frame assembly 99 is held in place when the cover 24 is in the normally closed position by engagement of the frame member 98 under the offset edge of the longitudinally extended cleat 113.

The cover 24, however, is hingedly attached to the vertical sidewall 14 and is rotatable upwardly relative to the hinge axis indicated at 114 in FIGURE 7. Thus, since the rotational radius of the frame edge 98 relative to the axis 100 is less than that of the cover cleat 113 relative to the hinge axis 114, as respectively indicated at 100–R and 114–R, the frame assembly 99 is automatically unlocked as the cover 24 is elevated, and conversely is locked in position against the undersurface of the cover 24 when the cover is closed upon the case.

Also clearly shown in the rear view of FIGURE 7 is a compact and highly effective counterbalance comprising a spiral spring 115 which is fixedly attached at 116 to a structural portion of the rear sidewall 13, and is terminated laterally in an angular end member 117 which is disposed under and exerts upward pressure against the downward end 118 of the vertically disposed support arm 32, thereby serving to offset the weight of the arm and the lens hood assembly 37 mounted thereon as seen in FIGURE 1.

Figure 4:
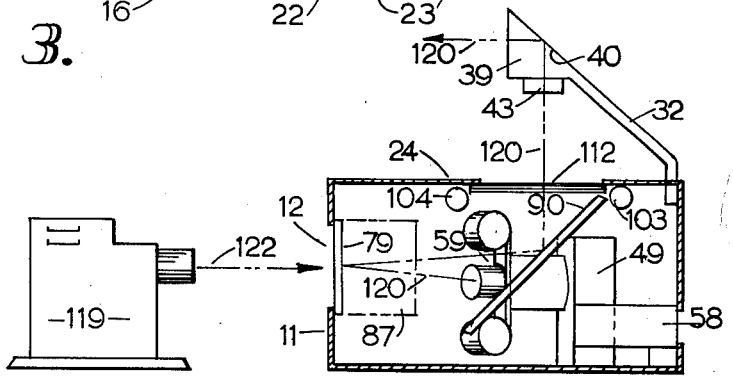
FIGURE 4 is a schematic diagram showing the folded optical paths of image bearing light beams from the internal and external projectors, through the device of my invention and onto a viewing screen.

The operation of the device, and its various combinations of functions possible, will be readily understood by reference to FIGURE 4 which is a purely schematic diagram taken along the line and in the direction indicated by the arrows 4—4 in FIGURE 3, showing the interior of the device from the side opposite from that shown in FIGURE 1.

As previously set forth, the more important objects of the invention relate to combining images formed upon or disposed on the plane of the transparent material 112 with the images being projected by the internal projector 59 or by any type of projector located exteriorly of the device and designated by the numeral 119 in FIGURE 4. However, it should be pointed out that the device is also useful for simple and conventional projection purposes, when required.

For a better understanding of the versatility of the device, its various functions will be explained briefly and without regard to their relative order of importance.

As will be seen in FIGURES 3 and 4, the image-bearing light beam from the projector 59 is directed along the broken line 120 upon the vertically disposed first reflecting surface 79, and from there rearwardly upon the diagonally disposed reflecting surface 90, thence upwardly through the cover glasses, Fresnel lens and transparent band at 112, through the lens 43, upon the reflecting surface 40 and thence outwardly through the aperture 39 along a generally horizontal path onto a viewing screen which is not shown in the diagram.

Or, if the vertically hinged structure 82 which supports the reflecting surface 79 is rotated as indicated in FIGURE 3 in the direction of the arrow 86 into the position shown at 87, images from the projector 59 may be directed through the aperture 12 in the front of the case, as indicated by the broken line 121 in FIGURE 3, and directly upon a screen. Furthermore, while the reflecting surface 79 is thus rotated, the frontal portion of the internal projector 59 may be rotated as indicated by the arrow 77 to the position 78 as shown in FIGURE 3, and the image-bearing light beams from an external projector 119 may be directed as indicated by the broken line 122 through the aperture 12 upon the reflecting surface 90 and thence along the general light path 120 as shown in FIGURE 4.

A better understanding of the character and degree of invention involved in my multi-purpose projector, together with a better appreciation of the significance of the particular combination and arrangement of elements shown therein, may be had from the foregoing discussion of the versatility of the device and from consideration of the problems involved therein.

In addition to making the device compact, portable and self-enclosing, it was necessary that its internal image-forming optical system be adapted to accommodate an internal projector having an image-forming light path of substantially the same length as that of a conventional projector used exteriorly therewith. This was necessary in order that the projectors could be used interchangeably without changing lenses or making other adjustments which might be required to keep their light paths within the optical limits of the device and to assure large images of the same size when projected directly onto a viewing screen.

The most important consideration, however, was the optical requirement that the projectors be spaced the same distance from the image-collecting plane so that the Fresnel lens would condense their light beams and direct them in precisely the same manner into the projection lens thereabove.

This spacing requirement involved a substantial departure from the optical arrangement used in conventional overhead transparency projectors of the type now common within the general art in which the light source is disposed immediately adjacent a reflecting surface which directs the light beam angularly through the condensing elements and upon the under surface of the transparency being projected.

The diagrams in FIGURE 4 clearly illustrate the manner in which the device of my invention provides an optical light path 120 for the internal projector 59 of approximately the same length as the light path 122 of the external projector 119 when measured from the lens of the respective projector to the horizontal plane 112 along which the aerial images are formed. Attention should also be directed to the fact that the relatively long light path, such as 120, makes possible the use of a single Fresnel lens 94 in FIGURE 2, to concentrate the light beam along the plane 112 and direct the beam into the projection lens 43. This feature provides a substantial saving in space and weight compared to the pairs of thick convex condensers seen in conventional transparency projectors.

A further functional advantage which derives from having light paths of equal lengths in the two projectors becomes apparent when the machine is placed in use. From a single fixed position in an auditorium or classroom both projectors throw the same size picture on a viewing screen either by direct projection or by projection through the folded light path and optical elements of the projector of my invention.

Thus, to enumerate the separate functions more specifically, picture images originating in the projector 59 may be projected outwardly of the case through the aperture 12 and directly upon a screen; or, secondly, when the vertical reflecting surface 79 is positioned over the aperture 12, the images may be projected along the light path 120 and directed over the head of the operator onto a screen; in a third use, movements such as writing, pointing and drawing may be introduced along the horizontal plane of the transparent material 112 with desired indicia being formed on the cellophane as the picture images are projected, or complete illustrations preformed on the cellophane may be combined with the picture images from the projector. In a fourth use, if only images drawn or preformed on the cellophane are to be projected, the projector 59 may be rotated to position 78 so that only the light beam from the lamp 50 and condenser 53 is available to illuminate the images disposed along the plane 112 and project them along the balance of the light path onto the screen.

In a fifth and additional functional arrangement, an external projector 119 is employed. Any sound or silent motion pictures, still pictures from film slides or strips, or images from so-called opaque projectors using non-transparent originals may be projected as indicated at 122 into the case through the aperture 12 and along the light path 120 over the head of the operator onto the screen, or secondary images formed or introduced along the plane of the material 112 may be combined therewith as desired.

From the foregoing it will be observed that I have provided a projection device having integral image-forming elements therein, and I have provided means for directing the images therefrom either directly or through a folded light path onto a screen.

It will be further observed that I have provided means for introducing additional pictorial material into the folded light path to combine it with the original images from the projector.

Attention is also called to the fact that I have provided structural and optical means whereby images from any type of projector positioned externally of the device are received and secondary images combined therewith while following a folded light path therethrough.

It will be noted additionally that I have provided a folded light path for the internal projector effective to produce an image generally equal in size to that formed at the same point by an external projector using a conventional lens.

It can also be seen from the specification that the device of my invention makes possible rapid shifts from one type of projected image to another without interrupting a series of pictures, and that I have provided means for removing a pair of winding spools, having a portion of a band of cellophane on each, without rewinding the band.

Also to be noted is the provision of interior stowage space for all of the machine elements, and the means provided for closing all of the apertures of the case while being transported or stored.

Although in order to comply with the statute I have described and illustrated a single embodiment of the device of my invention in considerable detail, it will be understood that these details are subject to change and the embodiment is open to certain variations and the invention itself is amenable to a plurality of embodiments and therefore is not to be restricted to the particular form shown herein nor limited in any manner except as may be indicated by the scope of the following claims.

What is claimed is:

1. An overhead projection device, comprising, a case having an aperture in the top and the front thereof; light source means, a first hinged reflecting surface and a second stationary reflecting surface resepectively disposed adjacent said front and top apertures and being relatively disposed and spaced apart so as to direct the light beam from said light source through a light path of substantially the same length as that of a conventional projector, and through said top aperture in said case; a condensing Fresnel lens supported interiorly of said top aperture and means for positioning movably thereabove a transparent band of image-bearing material; film guide means, independent of said light source and being movable into the light path thereof, for supporting pictorial film and slide material in the light beam of said light source, and lens means associated therewith for projecting said pictorial material whereby aerial images thereof are formed along a plane substantially coincident with that of said transparent band of image-bearing material interiorly of said top aperture; an external reflecting surface and projection lens adjacent thereto being disposed above said case and adapted to project images formed in said top aperture along an angular light path and to focus said images on a viewing screen; said first reflecting surface being mounted on the inner surface of a door hinged to said case and rotatable so as to open or close said frontal aperture; said second stationary reflecting surface being spaced from and angularly disposed relative to said frontal and said top apertures whereby an image-bearing light beam from a projector disposed externally of said case when directed through said frontal aperture upon said second reflecting surface is directed upwardly through said Fresnel lens so as to form aerial images in substancoplanar alignment with said image-bearing transparent band.

2. A multi-purpose overhead projection device comprising the combination of: an enclosing case member being generally right rectangular in conformation and having a top, a bottom, two sides, and two ends defining a front and a back of said case; light-passing apertures disposed in said operative top and said front surfaces, and an access aperture disposed in one of said sides of said case; closure means movably attached to said case adjacent each of said apertures, and being collectively effective to completely enclose said case; a light source and separate image-forming projector means adjacent thereto being disposed interiorly of said case adjacent said access aperture; a first reflecting surface attached to the inner surface of said movable closure adapted to open and close said frontal aperture; a second reflecting surface in and rigid with said case, and diagonally disposed relative to said first reflecting surface and said top aperture; a Fresnel lens mounted adjacent to said top aperture; support means defining an arm attached to said case; a hood assembly attached to an upwardly extended end of said arm, and a third reflecting surface adjustably disposed in said hood directly above and at an angle to said second reflecting surface, said reflecting surfaces being collectively adapted with said first reflecting surface in closed position, to successively direct the image bearing lightbeam from said projector through a folded light path of substantially the same length as the light path of a conventional projector upwardly through said top aperture in said case and forwardly from said third reflecting surface onto a viewing screen; lens means movably attached to said hood assembly and disposed adjustably in said light path for projecting and focusing images on said viewing screen; a band of transparent material supported on rollers adjacent said top aperture and crank means for moving said band in either direction in said aperture; said band being adapted for carrying preformed markings, and said separate image-forming projector being removably mounted in said case so as to be movable out of the path of the full light beam of said light source whereby said beam is directed upon said first reflecting surface, when in closed position, and second reflecting surface and upwardly through said top aperture to illuminate markings disposed therein and cause them to be projected through said hood assembly upon said viewing screen; said second reflecting surface being spaced from and diagonally disposed relative to said frontal and top apertures whereby an image-bearing light beam from a projector disposed externally of said case directed through said frontal aperture, with said first reflecting surface in open position, and upon said second reflecting surface is directed upwardly so as to form aerial images along a horizontal plane substantially coincident with that of said top aperture, and whereby said aerial images present in said aperture are projected simultaneously and in combination with markings disposed therein upon a viewing screen by said lens and third reflector means in said hood.

3. In an overhead projection device, the combination comprising: enclosing case means including two ends, a top, a bottom and two sides, one of said sides being uppermost and serving as the top when said device is disposed in normal operating position; a major light-passing aperture opening through said last described top, a frontal light-passing aperture in the forward end of said case; movable closure means adjacent each of said apertures collectively adapted to completely close said case; a first reflecting surface attached to the inner surface of said movable closure means adjacent said frontal aperture; a second reflecting surface rigidly disposed interiorly of said case and positioned diagonally relative to said first reflecting surface and said top aperture; means for adjustably supporting a projection lens and a third reflecting surface directly above said top aperture; a generally planar condensing Fresnel lens and means for supporting said Fresnel lens immediately below said top aperture; a longitudinally extended band of transparent material movably disposed above said Fresnel lens so as to fill substantially the entire area of said top aperture, and crank means for moving said band longitudinally in either direction; light source means in said case effective to direct a light beam of substantially the same degree of divergence as that of a conventional projector upon said first reflecting surface, said beam being folded backwardly from said first to said second reflecting surface, and upwardly therefrom through said Fresnel lens, then through said transparent band and said projection lens supported thereabove upon said third reflecting surface and directed thereby upon a vertically disposed transverse surface; said movable first reflecting surface, when positioned outside the path of said light beam, providing an opening whereby the light beam from an externally disposed projector is effective to form an aerial image in the plane of said Fresnel lens.

4. In combination, an overhead projection device comprising: a case having an aperture in the top, and front thereof; light source means including a condenser, a first hinged reflecting surface and a second reflecting surface relatively disposed interiorly of said case so as to direct the light beam from said light source through said top aperture in said case when said first reflecting surface is in its operative position; means for supporting a condensing Fresnel lens interiorly of said top aperture and for positioning movably thereabove and in substantial coplanar juxtaposition therewith a transparent band of image-bearing material; an external reflecting surface and projection lens adjacent thereto being disposed above said case and adapted to project images formed in said top aperture along an angular light path and to focus said images on a viewing screen when said first reflecting surface is in its operative position; said first reflecting surface being normally positioned so as to cover and close said frontal aperture therein and hingedly rotatable to open said frontal aperture whereby an image-bearing light beam, from a projector disposed externally of said case, when directed through said frontal aperture upon said second reflecting surface is directed upwardly so as to form aerial images along a plane in substantial coplanar alinement with said image-bearing transparent band, said aerial images and said images on said transparent band being projected simultaneously and in combination upon a viewing screen by said external projection lens and reflecting surface disposed above said case.

5. An overhead projection device having means for adding secondary images, indicia and markings to primary still and motion pictures while they are being projected, comprising the combination of: a generally rectangular case having a vertically disposed frontal aperture and a horizontally disposed top aperture; a door having a first reflecting surface attached to its inner surface, hinged to said case so as to open and close said frontal aperture and move said first reflecting surface respectively out of and into operative position; a second reflecting surface interiorly of said case disposed diagonally relative to said top and frontal apertures; a Fresnel condensing lens supported adjacent to said top aperture; a band of transparent material bearing pre-determined markings and adapted for the formation thereon of additional markings; means for supporting and moving said band longitudinally across said top aperture; a hood assembly including a third reflecting surface and a projection lens adjacent thereto, and an upright arm member adapted to support said hood directly above said top aperture; an internal projector, including a light source, a projection lens and means for supporting picture-bearing films therebetween, disposed in said casing so as to direct its image-bearing light beam upon said first reflecting surface, when the latter is in its operative position, in a manner whereby its image-bearing light beam is directed in a folded light path upon said second reflecting surface and through said top aperture and, together with said markings disposed on said transparent band, onto said third reflecting surface through said projection lens in said hood and upon a transverse surface; said overhead projection device being adapted to cooperate with an external projector having its own light source, projection lens and mechanical means for supporting therebetween transparent films having a plurality of pictures thereon, said external projector being disposed exteriorly of said case so as to direct its light beam through said frontal aperture, when said door therein is open and said first reflecting surface is inoperative relative to said internal projector, and upon said second reflecting surface from which it is directed upwardly through said top aperture and together with markings on said transparent band is directed by said third reflecting surface through said projection lens and upon said transverse surface; said external and internal projectors being adapted to cooperate with the structural and optical elements associated wtih said case whereby a continuous display of projected images may be maintained by operating one projector while reloading the other, and further avoiding interruption by switching instantaneously from the projected images of one projector to those of the other by respectively opening or closing said door in said frontal aperture.

6. An overhead projection device comprising a case having apertures in the top and front thereof; a light source means mounted in said case; a first movable reflecting means and a second rigid reflecting means respectively disposed adjacent said front and top apertures, said reflecting surfaces being relatively disposed so as to direct the light beam from said light source through said top aperture in said case; a condensing Fresnel lens supported interiorly of said top aperture; means for positioning a transparent band of image-bearing material above said Fresnel lens; an external reflecting surface; a projection lens adjacent to said external reflecting surface; said external reflecting surface and said projection lens being disposed above said case and adapted to project images formed in said top aperture along an angular light path; said first reflecting surface being movably mounted so as to open or close said front aperture; said second rigid reflecting surface being spaced from and angularly disposed relative to said front and said top apertures whereby an image-bearing light beam from a projector disposed externally of said case when directed through said front aperture upon said second reflecting surface is directed upwardly through said Fresnel lens so as to form aerial images in substantial co-planar alignment with said image-bearing transparent band.

7. An overhead projector comprising the combination of: a case having an aperture in its top surface; a light source disposed in said case; a first and a second reflecting surface adapted to direct the light beam from said light source through said top aperture; a Fresnel lens adjacent to said top aperture; means for supporting a longitudinally extended band of transparent image-bearing material adjacent to said top aperture; a film guiding assembly for supporting pictorial material in the path of the light beam of said light source; lens means associated with said film guiding assembly for projecting said pictorial material upon said first and said second reflecting surfaces and upwardly through said top aperture whereby aerial images thereof are formed along a plane substantially coincident with said top aperture; a supporting arm extending upwardly from said case; a third reflecting surface and a projection lens positioned on said supporting arm and disposed above said top aperture and adapted to project images therein along an angular light path upon a viewing screen; said film guiding assembly and lens associated therewith being movably mounted in said case and movable out of the path of the light beam of said light source whereby said light beam may be used exclusively to illuminate and project, in cooperation with said reflecting surfaces and said projection lens, the images on said image-bearing transparent band.

8. An overhead projector comprising the combination of: a case having apertures in its top and front; a light source disposed in said case; a first and a second reflecting surface adapted to direct the light beam from said light source through said top aperture; a Fresnel lens supported in said top aperture; means for supporting a longitudinally extended band of image-bearing material adjacent to said top aperture; a film guiding assembly for supporting pictorial material substantially adjacent to said light source in the path of the light beam of said light source; lens means associated with said means for supporting pictorial material for projecting said pictorial material upon said first and second reflecting surfaces and upwardly through said top aperture whereby aerial images thereof are formed along a plane substantially coincident with said top aperture; a supporting arm extending upwardly from said case; a third reflecting surface and a projection lens supported on said supporting arm and disposed above said top aperture and adapted to project image-bearing light from said top aperture along an angular path upon a viewing screen; said film guiding assembly and lens associated therewith being movably mounted so as to be capable of movement out of the path of the light beam of said light source when the light beam is used exclusively to illuminate and project, in cooperation with said reflecting surfaces and said projection lens, images formed adjacent said top aperture; said first reflecting surface being movably mounted so as to be capable of movement to open and close said front aperture whereby, when said front aperture is open, images in the light beam of said light source may be directed outwardly through said frontal aperture and directly upon a viewing screen.

9. An overhead projection device adapted to project images from a first projector disposed interiorly of said device and from a second generally conventional projector disposed exteriorly of said device through a folded light path upon a viewing screen comprising means for changing from projection of the images from the first projector to projection of those of the second projector, or vice versa, comprising a movable means having a first reflecting surface and a non-reflecting surface, said movable means being capable of movement so as to position said first reflecting surface in the path of the light beam emanating from said first projector and simultaneously position said non-reflecting surface in the path of the light beam emanating from said second projector, said movable means also being capable of being positioned such that neither said first reflecting surface nor said non-reflecting surface are in the paths of the light beams emanating from said projectors; a second reflecting surface; a third reflecting surface; a lens means associated with said third reflecting surface; said reflecting surfaces being relatively disposed such that when said first reflecting surface is positioned in the path of the light beam emanating from said first projector said light beam from said first projector is reflected successively from said first reflecting surface to said second reflecting surface to said third reflecting surface and to a viewing screen and when said non-reflecting surface is not in the path of the light beam emanating from said second projector said light beam from said second projector is directed from said second reflecting surface to said third reflecting surface and to a viewing screen; whereby, when light beams are emanating from both projectors, movement of said movable means into and out of the paths of said light beams changes the image on the viewing screen from that of said second projector to that of said first projector and from that of said first projector to that of said second projector, respectively.

10. An overhead projection device comprising a case having apertures in the top and front thereof; a light source disposed in said case; a first reflecting surface adapted to direct the light beam from said light source through said top aperture; a Fresnel lens adjacent to said top aperture; means for supporting a longitudinally extended band of transparent image-bearing material adjacent to said top aperture; a film guiding assembly for supporting pictorial material in the path of the light beam of said light source; lens means associated with said film guiding assembly for projecting said pictorial material upon said first reflecting surface and upwardly through said top aperture whereby aerial images thereof are formed along a plane substantially coincident with said top aperture; a supporting arm extending upwardly from said case; a second reflecting surface and a projection lens positioned on said supporting arm and disposed above said top aperture and adapted to project images therein along an angular light path upon a viewing screen; said film guiding assembly and lens associated therewith being movably mounted for movement out of the path of the light beam of said light source whereby said light beam may be used exclusively to illuminate and project, in cooperation with said reflecting surfaces and said projection lens, the images on said image-bearing transparent band.

References Cited in the file of this patent
UNITED STATES PATENTS

| | | |
|---|---|---|
| 2,181,133 | Katz | Nov. 28, 1939 |
| 2,543,561 | Tracy | Feb. 27, 1951 |
| 2,699,704 | Fitzgerald | Jan. 18, 1955 |
| 2,754,722 | Howell et al. | July 17, 1956 |
| 2,859,660 | Lucas | Nov. 11, 1958 |